Dec. 30, 1930.  E. W. ISOM ET AL  1,786,493
ART OF REFINING HYDROCARBONS
Filed March 27, 1929
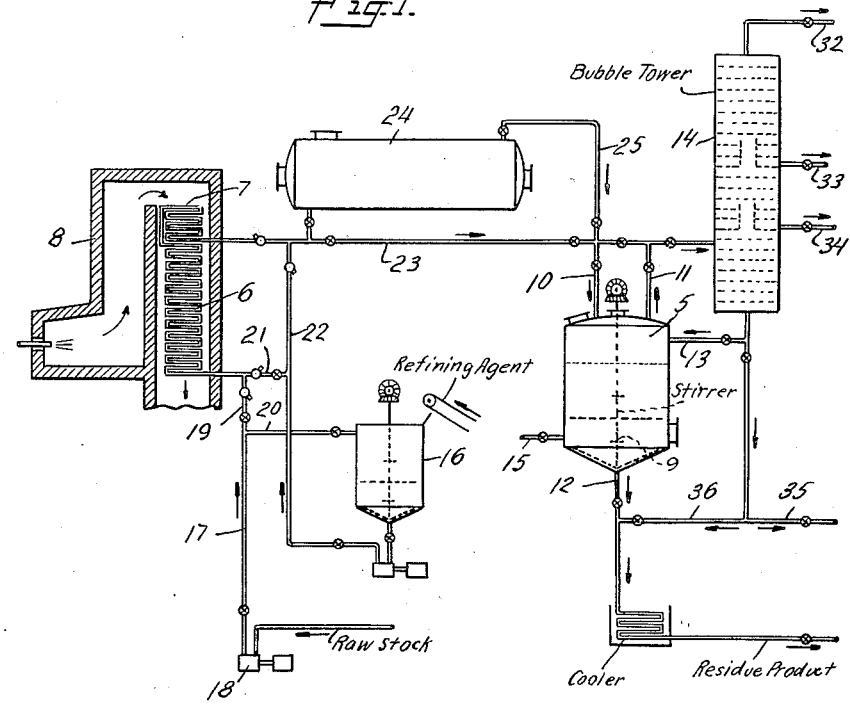
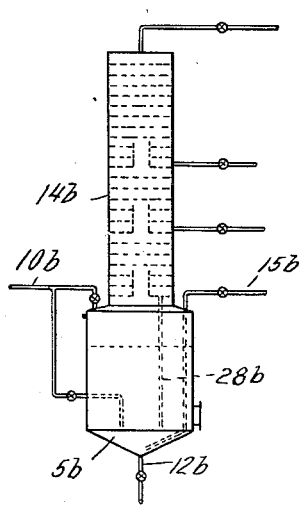
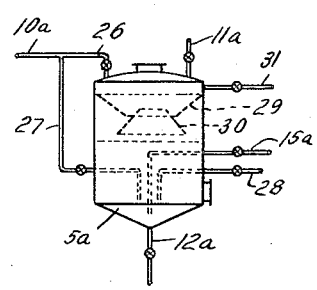
INVENTORS
Edward W. Isom
Ernest B. Phillips
BY
ATTORNEYS Patented Dec. 30, 1930

1,786,493

UNITED STATES PATENT OFFICE

EDWARD W. ISOM, OF SCARSDALE, NEW YORK, AND ERNEST B. PHILLIPS, OF EAST CHICAGO, INDIANA, ASSIGNORS TO SINCLAIR REFINING COMPANY, OF NEW YORK, N. Y., A CORPORATION OF MAINE

ART OF REFINING HYDROCARBONS

Application filed March 27, 1929. Serial No. 350,152.

This invention relates to the handling of petroleum stocks including components valuable as viscous oils and particularly to the manufacture of refined viscous petroleum oils. The invention provides an improved combined operation including a heating and a digestion of the raw stock while maintaining in suspension therein a solid absorbent refining agent.

According to the present invention, a solid absorbent refining agent is suspended in the raw stock, this absorbent-stock mixture is passed through a heating zone as a rapidly flowing stream and in the heating zone is heated to a temperature not substantially exceeding 750° F. and less than that at which any substantial cracking takes place within the period of time the absorbent-stock mixture is flowing through the heating zone, the hot absorbent-stock mixture is discharged from the heating zone into a vaporizing and digesting zone from which vapors of lower boiling components are taken off, a substantial body of liquid in which the absorbent is maintained in suspension is maintained in the vaporizing and digesting zone to subject the residue therein to a period of digestion in contact with the solid absorbent refining agent, the temperature in the vaporizing and digesting zone is maintained above the boiling point, under the conditions prevailing therein, of all components lower boiling than desired as components of the residue product, the volume of the body of liquid in the vaporizing and digesting zone is regulated so that the residue remains therein a period of time advantageously not less than five times as long as the raw stock mixture is in the heating zone, and the refined viscous oil product is discharged from the vaporizing and digesting zone as a residue including in suspension the solid absorbent refining agent. The operation is carried out as a continuous operation, with the continuous supply of the absorbent-stock mixture to the heating zone, the continuous taking off of vapors from the vaporizing and digesting zone and the continuous discharge, or the regularly intermittent discharge, of the residue from the vaporizing and digesting zone. To prolong the period of digestion, the hot absorbent-stock mixture may be passed from the heating zone through a supplemental digesting zone, in which vapors are not separated from liquid, before being discharged into the vaporizing and digesting zone. The solid absorbent refining agent is maintained in suspension in the residue in the vaporizing and digesting zone to prolong the period of contact between the residue and the absorbent and to maintain uniform the contact between the residue and the absorbent by avoiding variations in the concentration of the absorbent in the residue. The temperature is maintained in the vaporizing and digesting zone to maintain the activity of the absorbent as a refining agent as well as to promote the separation as vapors of lower boiling components. The vapors taken off from the vaporizing and digesting zone may be condensed or fractionated and condensed, in the conventional maner, for the recovery of the lower boiling components of the raw stock as a distillate or distillates also subjected to the action of the solid absorbent refining agent in the combined operation. The refined viscous oil product, discharged as a residue from the vaporizing and digesting zone, is heated to an elevated temperature, but to a temperature limited to avoid cracking, in the heating zone in intimate contact with the solid absorbent refining agent and is maintained at elevated temperature in intimate contact with the solid absorbent refining agent for a substantial period of time in the vaporizing and digesting zone. After discharge from the vaporizing and digesting zone, the residue mixture including the solid absorbent agent is subjected to any convenient treatment for the separation of the solid absorbent refining agent and to such other treatment as may be necessary for the production of the desired finished product. The invention, however, enables the direct production, except for the separation of the solid absorbent refining agent and in some cases wax, of finished viscous oil products, lubricating oils and the like.

The invention is of special value in the handling of crude petroleum stocks. The term "crude petroleum stocks" is used to include raw crude petroleums and topped crude petroleums, that is crude petroleums from which some lower boiling components have been separated. The invention also is of special value in the manufacture of oils having a viscosity upwards of 100 at 210° F. (Saybolt) such as long residuum stocks and bright stocks from crude petroleum stocks. The invention is also useful, for example, in the manufacture of refined neutral oils from pressed paraffin distillates. The process of the invention is applicable to oils which have been treated with sulphuric acid as well as to oils which have not been so treated.

The invention will be further described in connection with the accompanying drawings which illustrate, diagrammatically and conventionally, several forms of apparatus adapted for carrying out the invention. The invention, as will be apparent, may be carried out in other and different forms of apparatus.

In the accompanying drawings, Fig. 1 represents in elevation and partly in section an apparatus adapted for carrying out the invention, Fig. 2 represents a modified vaporizing and digesting chamber, and Fig. 3 represents a modified combined vaporizing and digesting chamber and fractionating tower.

Referring to Fig. 1, the mixture of the raw stock to be treated and the solid absorbent refining agent is forced through the heating coils of a conventional pipe still into the vaporizing and digesting chamber 5. The pipe still illustrated comprises a pair of heating coils 6 and 7 connected in series, each of these heating coils consisting of a series of pipes connected to form a long continuous heating coil, arranged in the heating flue of a furnace 8. The absorbent stock mixture flows upwardly through the heating coil 6 countercurrent to the heating gases and then downwardly through the heating coil 7 concurrent to the heating gases. The vaporizing and digesting chamber 5 is provided with an agitator 9 the arms of which are arranged below the normal liquid level within the chamber. The agitator illustrated is adapted to be driven by a shaft extending through a stuffing box in the top of the chamber. The hot absorbent stock mixture from the pipe still is discharged into the chamber 5 through connection 10. The vapors separated in the chamber 5 are taken off through connection 11. The residue, including the solid absorbent refining agent, is discharged through connection 12. Connection 13 is provided for the return, as reflux, of condensate from the fractionating tower 14. Connection 15 is provided for the introduction of superheated steam into the lower part of the vaporizing and digesting chamber 5. The connections between the pipe still and the vaporizing and digesting chamber 5 and the vaporizing and digesting chamber 5 itself are heavily lagged, or thermally insulated, to make unnecessary or to reduce to a minimum any supplemental supply of heat to this chamber. The solid absorbent refining agent is suspended in the raw stock in the mixer 16. The raw stock is supplied through connection 17 by means of pump 18. All of this raw stock may be supplied to the mixer 16, or part of the raw stock may be supplied directly to the heating coil 6 through connection 19 and part of the mixer 16 through connection 20 and the absorbent-stock mixture from the mixer 16 supplied to the heating coil 6, together with the raw stock supplied through connection 19, through connection 21. If unusually large amounts of the solid absorbent refining agent are required for the treatment of a raw stock, the major part of the raw stock may be supplied directly to the heating coil 6 through connection 19, the solid absorbent refining agent may be suspended in the remaining minor part of the raw stock in the mixer 16, part of this absorbent-stock mixture may be supplied to the heating coil 6 through connection 21 and part of this absorbent-stock mixture may be admixed with the hot absorbent-stock mixture discharged from the heating coil 7, through connection 22. The hot absorbent stock mixture from the pipe still may either be discharged directly into the vaporizing and digesting drum 5 through connection 23 or be passed through the supplemental digesting chamber 24 and then discharged into the vaporizing and digesting chamber 5 through connection 25. If a supplemental digesting chamber 24 is used, it also is heavily lagged or thermally insulated. Such a supplemental digesting chamber may also be provided with an agitator to assist in maintaining the solid absorbent refining agent in suspension in the oil while passing therethrough. Any supplemental heat required in the vaporizing and digesting chamber 5 is supplied by the introduction of superheated steam through connection 15. The absorbent-stock mixture may be supplied to the pipe still under pressure just sufficient to force it therethrough into the vaporizing and digesting drum or under a higher pressure, particularly when a supplemental digesting chamber is used, and the excess pressure released as the hot absorbent-stock mixture is discharged into the vaporizing and disgesting zone. Vaporization in the pipe still, or in the supplemental vaporizing chamber, may thus be inhibited and the capacity of the apparatus increased.

Instead of providing a mechanical agitator to maintain the solid absorbent refining agent in suspension in the liquid body of oil maintained in the vaporizing and digesting chamber 5, the hot absorbent-stock mixture from the pipe still, or part of this hot absorbent-stock mixture, may be introduced into the liquid body in a manner to provide the necessary agitation, or a condensate condensed from the vapors taken off from the vaporizing and digesting chamber may be introduced into the liquid oil body in a manner to provide the necessary agitation, for example. Superheated steam supplied to the vaporizing and digesting chamber as a heating medium may also, as a further example, be introduced in a manner promoting the maintenance of the suspension of the solid absorbent refining agent in the oil.

A modified vaporizing and digesting chamber 5a is illustrated in Fig. 2. The hot absorbent stock mixture from the pipe still is introduced into the vaporizing and digesting chamber 5a through connection 10a, vapors are taken off through connection 11a and the residue product is discharged through connection 12a. The hot absorbent stock mixture supplied through connection 10a may be introduced into the chamber 5a either through connection 26 (as through connection 10 in the apparatus illustrated in Fig. 1) or through connection 27 or in part through connection 26 and in part through connection 27. Connection 27 is arranged to discharge the hot absorbent-stock mixture directly into the lower part of the liquid body normally maintained in the chamber 5a to provide agitation of the liquid body of oil by such introduction. Connection 15a, arranged similarly to connection 27, is provided for the introduction of superheated steam. Connection 28 is provided for the introduction of a condensate condensed from the vapors taken off from the vaporizing and digesting chamber 5a (a condensate from the fractionating tower 14 in the apparatus illustrated in Fig. 1 for example), or some similar fraction, to provide agitation of the liquid body of oil normally maintained in the chamber 5a. A pair of frustro-conical annular baffles 29 and 30 are provided in the upper part of the vaporizing and digesting chamber 5a, above the normal liquid level therein, for promoting the separation of vapors and vaporizable components from the residue product. These baffles are arranged, as illustrated, so that any solid absorbent refining agent deposited on them may be washed downwardly into the liquid body of oil maintained in the lower part of the vaporizing and digesting chamber 5a by hot absorbent-stock mixture introduced through connection 26, for example, or by condensate (such as a condensate produced in the fractionating tower 14 in the apparatus illustrated in Fig. 1) introduced through connection 31, for example. Two, four or six such baffles, for example, may be provided in the upper part of the vaporizing and digesting chamber to promote the separation of vapors and liquids, or other suitable baffling means may be provided in the upper part of the vaporizing and digesting chamber for this purpose.

Another modified vaporizing and digesting chamber 5b, combined with the fractionating tower 14b, is illustrated in Fig. 3. The hot absorbent-stock mixture from the pipe still is introduced through connection 10b and the residue product is discharged through connection 12b. The vapors from the vaporizing and digesting chamber 5b pass directly into the lower end of the fractionating tower 14b. Connection 15b is provided for the introduction of superheated steam. Connection 28b is provided for discharging condensate from the lower end of the fractionating tower 14b into the liquid body of oil normally maintained therein to provide agitation of the liquid body of oil by such introduction. Except in its arrangement directly on the vaporizing and digesting chamber, the fractionating tower 14b is similar in construction and operation to the fractionating tower 14 illustrated in Fig. 1.

Again referring to Fig. 1, the fractionating tower 14 is of conventional "bubble plate" construction. A series of side fractions, in addition to the fraction taken off as vapors from the upper end of the tower through connection 32, may be taken off as condensates from intermediate points through connections 33 and 34. The heaviest condensate produced in the fractionating tower 14, or part of it, may be discharged through connection 35, or this condensate or part of it may be refluxed to the vaporizing and digesting chamber 5 through connection 13. This condensate or part of it may also be added to the residue product discharged from the vaporizing and digesting chamber 5 through connection 12 through connection 36. If any of the solid absorbent refining agent is carried over with the vapors taken off from the vaporizing and digesting chamber 5, the heaviest condensate produced in the fractionating tower 14 is with advantage returned to the vaporizing and digesting chamber 5 through connection 13 (or through connection 28 or connection 31 in the apparatus illustrated in Fig. 2).

The solid absorbent refining agents useful in carrying out the invention include absorbent earths, acid treated earths and clays, absorbent gels, and the like. In general, any of the solid absorbent refining agents commonly used for refining lubricating oils, for example, at elevated temperatures are useful in carrying out the invention. Using "terrana" earth, for example, about 5% by weight of the earth on the oil is usually satisfactory in running raw crude oils for a bright stock or a long residuum residue product. As will be apparent, this proportion may be varied, and this particular proportion is given simply to illustrate one proportion which has been used.

After discharge from the vaporizing and digesting chamber, the residue product including in suspension the solid absorbent refining agent, or this residue product together with a heavy condensate separated from the vapors taken off from the vaporizing and digesting drum, may be treated in any convenient manner for the separation of the solid absorbent refining agent. For example, the absorbent-stock mixture discharged from the vaporizing and digesting drum as a residue may be cooled, the cooled absorbent stock mixture then diluted with a naphtha fraction, the diluted mixture then passed through "cake" and "blotter" filter presses for the separation of the solid absorbent refining agent, and the filtered residue stock then subjected to steam distillation for the separation of the naphtha fraction diluent. Following the separation of the solid absorbent refining agent and prior to the separation of the naphtha fraction diluent, the residue product may be subjected to a dewaxing operation.

The invention will be further illustrated by the following example: An absorbent-stock mixture consisting of a raw Pennsylvania grade crude petroleum and 5% by weight on the oil of "terrana" earth is supplied to the pipe still. The pipe still operation is regulated to maintain a discharge temperature of about 650° F. The hot absorbent-stock mixture discharged from the pipe still is introduced directly into the vaporizing and digesting chamber. A body of liquid is maintained in the vaporizing and digesting chamber such that, at the rate at which the raw absorbent-stock mixture is supplied to the pipe still, the residue product remains in the vaporizing and digesting chamber a period averaging 100–300 minutes; the raw absorbent stock mixture being in passage through the pipe still a period approximating 15 minutes. Superheated steam, at a temperature of about 650° F., is introduced into the liquid body in the vaporizing and digesting chamber at a rate sufficient to maintain a liquid temperature of about 620° F. The solid absorbent refining agent is maintained in suspension in the liquid body in the vaporizing and digesting chamber by this introduction of steam assisted by mechanical agitation. The vapors from the vaporizing and digesting chamber are subjected to a reflux fractionating operation regulated to maintain the residue product discharged from the vaporizing and digesting chamber of a viscosity of 120 at 210° F. (Saybolt). A bright stock residue product of 6 color amounting to about 21% on the raw crude petroleum supplied to the pipe still is obtained.

In carrying out the invention for the production of bright stock or long residuum residue products, the operation of the vaporizing and digesting chamber is regulated so that the residue discharged therefrom has a flash and a viscosity at least as high as are required of the finished product. When any condensate produced from the vapors taken off from the vaporizing and digesting chamber is to be added to the residue product, the operation of the vaporizing and digesting chamber is regulated to produce an initial residue product having a flash and a viscosity higher than required of the finished product to allow for the addition of this condensate.

We claim:

1. In the manufacture of refined viscous petroleum oils, an improved combined operation which comprises suspending a solid absorbent refining agent in the raw stock, passing this absorbent-stock mixture through a heating zone as a rapidly flowing stream and heating it therein to a temperature not substantially exceeding 750° F. and less than that at which any substantial cracking takes place within the period of time the absorbent-stock mixture is flowing through the heating zone, discharging the absorbent stock mixture from the heating zone into a vaporizing and digesting zone, taking off vapors from the vaporizing and digesting zone, maintaining a substantial body of liquid at a temperature of approximately 620° F. in the vaporizing and digesting zone, maintaining the solid absorbent refining agent in suspension in this body of liquid during the operation, discharging the refined viscous oil product from the vaporizing and digesting zone as a residue including in suspension the solid absorbent refining agent, and regulating the volume of the body of liquid maintained in the vaporizing and digesting zone such that the residue product remains therein a period of time not less than five times as long as the raw absorbent stock mixture is in the heating zone.

2. In the manufacture of refined viscous petroleum oils, an improved combined operation which comprises suspending a solid absorbent refining agent in a crude petroleum stock, passing this absorbent-stock mixture through a heating zone as a rapidly flowing stream and heating it therein to a temperature not substantially exceeding 750° F. and less than that at which any substantial cracking takes place within the period of time the absorbent-stock mixture is flowing through the heating zone, discharging the absorbent stock-mixture from the heating zone into a vaporizing and digesting zone, taking off vapors from the vaporizing and digesting zone, maintaining a substantial body of liquid at a temperature of approximately 620° F. in the vaporizing and digesting zone, maintaining the solid absorbent refining agent in suspension in this body of liquid during the operation, discharging the refined viscous oil product from the vaporizing and digesting zone as a residue including in suspension the solid absorbent refining agent, and regulating the volume of the body of liquid maintained in the vaporizing and digesting zone such that the residue product remains therein a period of time not less than five times as long as the raw absorbent stock mixture is in the heating zone.

3. In the manufacture of refined viscous petroleum oils, an improved combined operation which comprises suspending a solid absorbent refining agent in a crude petroleum stock, passing this absorbent-stock mixture through a heating zone as a rapidly flowing stream and heating it therein to a temperature not substantially exceeding 750° F. and less than that at which any substantial cracking takes place within the period of time the absorbent stock mixture is flowing through the heating zone, discharging the absorbent stock mixture from the heating zone into a vaporizing and digesting zone, taking off vapors from the vaporizing and digesting zone, maintaining a substantial body of liquid in the vaporizing and digesting zone, maintaining the solid absorbent refining agent in suspension in this body of liquid during the operation, maintaining the body of liquid in the vaporizing and digesting zone at a temperature such that the residue product discharged from the vaporizing zone has a viscosity upwards of 100 at 210° F. (Saybolt), discharging the refined viscous oil product from the vaporizing and digesting zone as a residue including in suspension the solid absorbent refining agent, and regulating the volume of the body of liquid maintained in the vaporizing and digesting zone such that the residue product remains therein a period of time not less than five times as long as the raw absorbent stock mixture is in the heating zone.

In testimony whereof we affix our signatures.

EDWARD W. ISOM.
ERNEST B. PHILLIPS.